June 14, 1966 A. T. KELLY 3,256,475
RECTIFIER CIRCUIT
Filed Jan. 8, 1962 2 Sheets-Sheet 1

INVENTOR
AUSTIN T. KELLY
BY [signature]
ATTORNEY

INVENTOR
AUSTIN T. KELLY
BY [signature]
ATTORNEY

United States Patent Office 3,256,475
Patented June 14, 1966

3,256,475

RECTIFIER CIRCUIT

Austin T. Kelly, Morristown, N.J., assignor to Weston Instruments, Inc., a corporation of Texas Filed Jan. 8, 1962, Ser. No. 164,719
5 Claims. (Cl. 321—18)

This invention relates to a rectifier circuit and more particularly to such a circuit for producing an output potential that can be made to change polarity in accordance with variations in the magnitude of the alternating potential applied to the input.

Recent advances in solid state technology have produced a device known as a tunnel or unitunnel diode. As those knowledgeable in the semiconductor art are aware, such a diode may be of silicon or germanium, the p-n junction being so treated during manufacture as to produce a diode having a voltage-current characteristic very different from any other type of diode yet developed.

I have discovered that this characteristic can be utilized by means of an appropriate arrangement of electrical components to produce a circuit which operates in a novel manner not possible prior to the advent of the tunnel diode.

Accordingly, it is an object of this invention to provide a means for receiving an alternating current or potential wave and for producing therefrom a direct potential which can have a value of zero when the value of the alternating wave is greater than zero, and which can be either positive or negative in value depending upon the magnitude of the applied alternating wave.

A further object is to provide a rectifier circuit capable of producing an output potential of zero for a given value of applied alternating potential, and which can be changed either to a positive or to a negative value by varying the applied alternating potential above or below this given value.

Still another object is to produce a device of the character described which is simple and inexpensive and which can be easily employed for accomplishing various measuring and control functions.

All of the objects, features and advantages of the invention will be best understood from a study of the following detailed description taken in conjunction with the claims and with the drawings in which:

Figure 1:
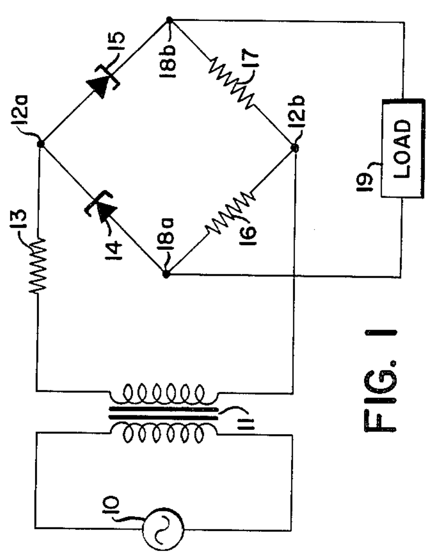
FIGURE 1 shows a circuit for producing rectified potential in accordance with the principles of my invention.

Referring now to FIGURE 1, there is shown an alternating current or potential source 10 connected to a transformer 11, the secondary of which is connected to a pair of terminals **12*a* and 12*b* through a current limiting resistor 13. These terminals are the input terminals to a bridge circuit which includes a pair of similar tunnel diodes 14 and 15 each connected to form one arm of the bridge. The anode of one diode and the cathode of the other diode are connected to a common point, this point being the input terminal 12*a* in FIGURE 1. A pair of resistors 16 and 17 each forms another arm of the bridge, each resistor being connected in series with one of the diodes to form two parallel paths between the input terminals of the bridge. These resistors should be approximately equal in value for proper operation. The output of the bridge appears between the junctions or terminals 18*a* and 18*b*, these terminals being connected to a load 19**, which may be a resistor or other suitable device as will be explained hereinafter.

Figure 2:
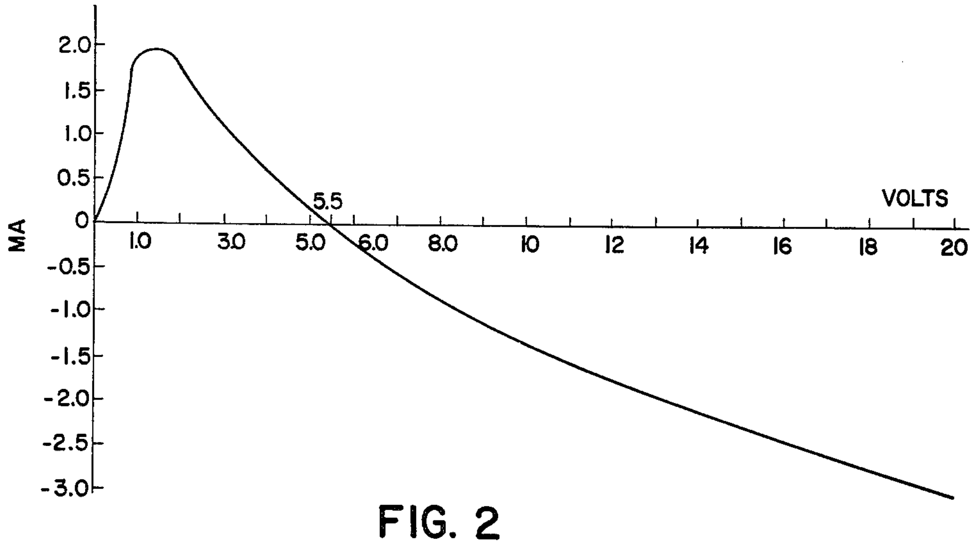
FIGURE 2 is a graph showing the manner in which the output current from the circuit of FIGURE 1 varies in accordance with the magnitude of the applied alternating wave.
Figure 3:
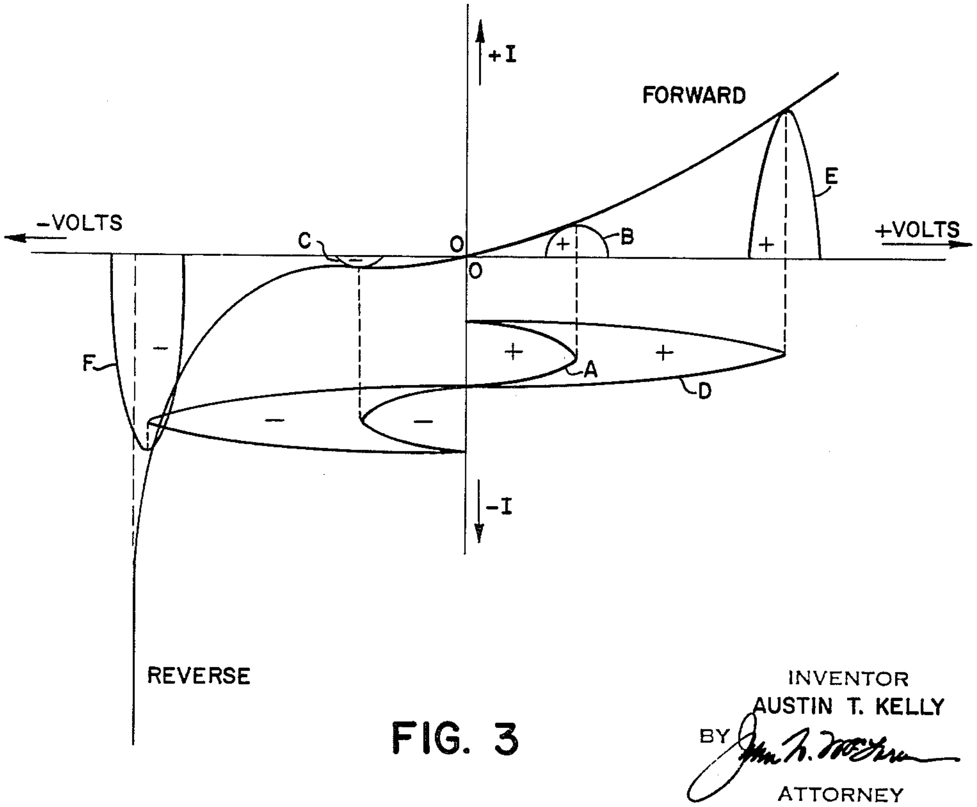
FIGURE 3 is a graph showing the voltage-current characteristic of the particular type diode employed with my invention.

The basic circuit of FIGURE 1 operates in a novel manner which is best explained with reference to FIGURES 2 and 3. FIGURE 2 shows a graph of D.C. output current with changes in the applied alternating potential to the bridge input terminals 12*a*–12*b* and FIGURE 3 shows a graph of the volt-ampere characteristic of the tunnel diodes employed to carry out the invention. From FIGURE 2 it can be seen that the direct current value at the output terminals **18*a* and 18*b*** rises to a maximum value for an applied alternating potential of a given magnitude, and that for increased potentials above this value the current decreases in value. This is due to the volt-ampere characteristic of the tunnel diode which is such that its forward impedance is substantially smaller than its reverse impedance for small voltages up to a certain value. This will be clear from the graph of FIGURE 3 where it will be seen that for a sine wave input A of small magnitude, the magnitude of forward positive current wave B is substantially greater than that of the reverse negative current wave C, resulting in a net positive current. At some value of applied alternating potential larger than the magnitude of the input wave A, the diode reverse impedance and the forward impedance have an equal value. At this point the alternating current input wave of course sees an equal impedance in both directions and, consequently, the output current from the bridge is zero. The alternating potential value at which this occurs is 5.5 volts for the particular diodes employed in obtaining the curve of FIGURE 2 and will naturally vary somewhat depending upon the particular diodes used. Continuing to increase the value of the applied alternating potential above this value causes a greater decrease in the reverse impedance than in the forward impedance so that a direct current will flow in the reverse direction (see FIGURE 3), the polarity of the output potential of course also being reversed. As the applied alternating potential magnitude is increased above the value of 5.5 volts corresponding to the zero-current crossover point, the current magnitude will increase as shown by the portion of the graph below the abscissa in FIGURE 2.

This latter condition will be clear from FIGURE 3 which shows a sine wave input D of magnitude greater than 5.5 volts producing a positive rectified wave E on the positive portion of the cycle, and a relatively larger negative rectified value F on the negative portion of the cycle. As a consequence, a net negative or reverse current as shown in FIGURE 2 and a potential of reversed polarity to that produced by the smaller input wave A now result. It will be appreciated that the above described manner of operation is possible due to the particular asymmetrical nature of the diode volt-ampere characteristic curve.

Figure 4:
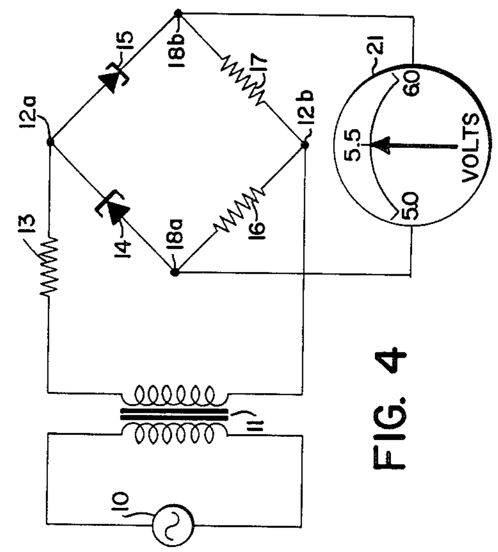
FIGURE 4 shows the circuit of FIGURE 1 adapted for use in actuating an expanded scale voltmeter.

Reference will now be made to the remaining FIGURES 4–6 in which like numerals indicate like components illustrated in FIGURE 1. FIGURE 4 shows the circuit of FIGURE 1 in combination with a meter 21 of the type well-known in the art having a central scale pointer position when the input current to the meter is zero and a deflection either side of center depending upon the direction of the input current. Referring again to the graph of FIGURE 2 it will be appreciated that the meter 21, when properly calibrated, can be made to indicate the value of the input potential from the source 10 with the aid of the circuit shown. Meters of the type indicated by the numeral 21 are of course well-known as expanded scale meters and those knowledgeable in the art will be aware that the combination shown in FIGURE 4 provides an expanded scale meter arrangement which is much simpler and far less expensive than known circuits used to accomplish such measurements.

Figure 5:
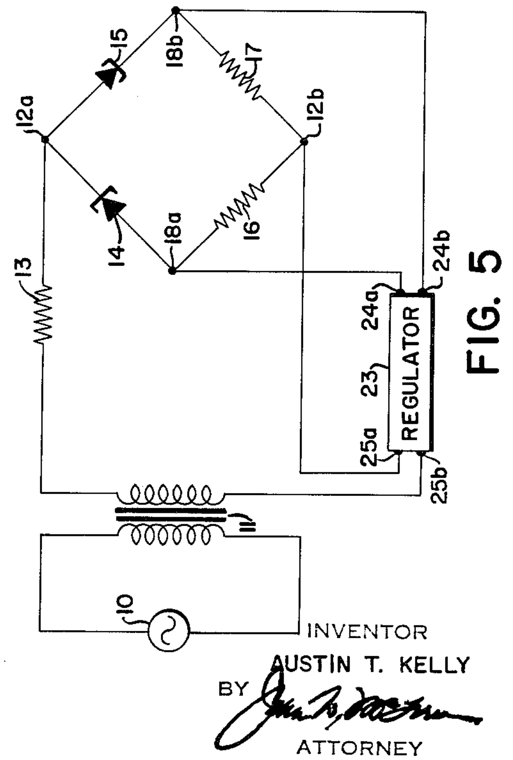
FIGURE 5 shows the circuit of FIGURE 1 adapted for controlling or regulating the input potential applied to the bridge circuit.

FIGURE 5 illustrates the basic circuit of FIGURE 1 employed to control or regulate the potential applied to the input terminals 12*a*–12*b* of the bridge. This is accomplished by means of feeding the output potential from the bridge terminals 18*a*–18*b* into a regulator device 23. This device is essentially a feedback device which operates by utilizing a given D.C. potential or current shift across a pair of input terminals 24*a*–24*b* to cause an appropriate change in the value of an A.C. potential at the output terminals 25*a*–25*b* to automatically counteract any changes in the A.C. potential to the bridge input terminals 12*a*–12*b*. Any one of several such devices well-known in the art can be employed for this purpose. A feedback loop is thus provided which operates to maintain the applied input potential constant when it tends to change, causing resultant fluctuations in the output potential.

Figure 6:
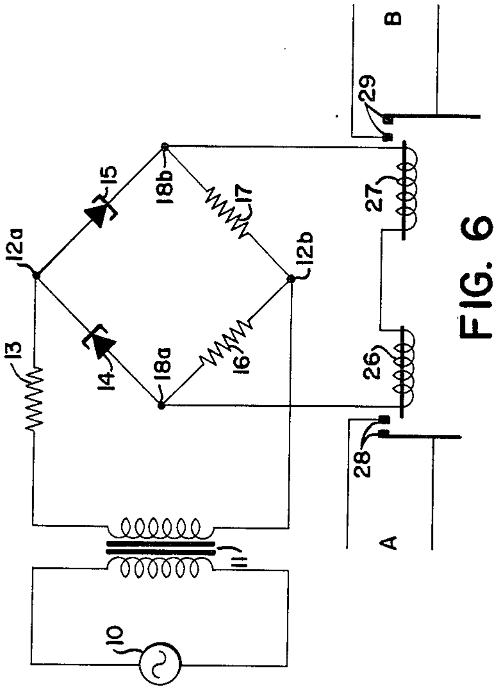
FIGURE 6 shows the circuit of FIGURE 1 employed for actuating one of a pair of relays depending upon the polarity of the bridge output potential.

FIGURE 6 illustrates the basic circuit employed for controlling one of a pair of separate circuits A and B depending upon the potential polarity or current direction from the output terminals of the bridge. Accordingly, the bridge can be designed to apply an output to a pair of relays 26 and 27 connected in series across the output terminals 18*a*–18*b*. In one mode of operation an alternating potential of a given value is supplied to the input terminals 12*a*–12*b* to produce a zero D.C. output so that neither relay is energized. A decrease in the value of the alternating potential would then produce an output potential and an output current of a given direction to actuate the relay 26 to close the contacts 28. An increase in the alternating potential would then produce a reversed output polarity and current to actuate the relay 27 to close the contacts 29 while de-energizing the relay 26 to open the contacts 28. An alternative mode of operation could be employed such as, for example, by energizing first one relay and then the other without de-energizing the first one. Still other modes of operation will occur to those knowledgeable in the art.

It will be obvious that neither the transformer 11 nor the current limiting resistor 13 forms a necessary part of the basic circuit of my invention and that quite satisfactory operation thereof can be accomplished without them. It should also be observed that the term "alternating potential" as used throughout the specification and claims implies a source which is capable of producing a current in addition to a potential.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. A rectifier circuit comprising,
a bridge network having a pair of input terminals adapted for connection to a source of alternating potential,
said bridge including a first series circuit and a second series circuit connected in parallel between said input terminals,
said first and second circuits each including a diode connected in series with a resistor,
the anode of one of said diodes and the cathode of the other of said diodes being connected to a common point serving as one of said input terminals, said diodes having a ratio of forward-to-reverse impedance which varies asymmetrically from substantially greater than one to substantially less than one with changes in the applied alternating potential,
the junction between the diode and resistor in each of said series circuits each forming an output terminal for said bridge,
whereby substantially no output signal is produced between said output terminals when a given value of alternating potential is applied to said input terminals.

2. The invention as set forth in claim 1 wherein said resistors are of approximately equal value,
said invention being further characterized in that an output signal is produced between said output terminals having a certain polarity when the value of said alternating potential is less than said given value and a reverse polarity when the value of said alternating potential is greater than said given value.

3. In combination,
a bridge network having a pair of input terminals adapted for connection to a source of alternating potential,
said bridge including a first series circuit and a second series circuit connected in parallel between said input terminals,
said first and second circuits each including a diode connected in series with a resistor,
the anode of one of said diodes and the cathode of the other of said diodes being connected to a common point serving as one of said input terminals,
said diodes having a volt-ampere characteristic such that the forward impedance of said diodes is less than the reverse impedance when said alternating potential is less than a given value and greater than said reverse impedance when said alternating potential is greater than said given value,
the junction between the diode and the resistor in each of said series circuits each forming an output terminal for said bridge,
and an instrument connected between said output terminals and having an indicator responsive to the output signal developed across said output terminals,
said indicator producing a deflection in one direction when said alternating potential is changed to a value less than said given value and in a direction opposite thereto when said alternating potential is changed to a value greater than said given value.

4. In combination,
a bridge network having a pair of input terminals adapted for connection to a source of alternating potential,
said bridge including a first series circuit and a second series circuit connected in parallel between said input terminals,
said first and second circuits each including a diode connected in series with a resistor,
the anode of one of said diodes and the cathode of the other of said diodes being connected to a common point serving as one of said input terminals,
said diodes having a volt-ampere characteristic such that the forward impedance of said diodes is less than the reverse impedance when said alternating potential is less than a given value and greater than said reverse impedance when said alternating potential is greater than said given value,
the junction between the diode and the resistor in each of said series circuits each forming an output terminal for said bridge,
and a feedback loop connected between said bridge output terminals and said bridge input terminals for maintaining the output of said bridge substantially constant with changes in the amplitude of the alternating potential applied to said input terminals.

5. In combination,
a bridge network having a pair of input terminals adapted for connection to a source of alternating potential,
said bridge including a first series circuit and a second series circuit connected in parallel between said input terminals,
said first and second circuits each including a diode connected in series with a resistor,
the anode of one of said diodes and the cathode of the other of said diodes being connected to a common point serving as one of said input terminals,
said diodes having a volt-ampre characteristic such that the forward impedance of said diodes is less than the reverse impedance when said alternating potential is less than a given value and greater than said reverse impedance when said alternating potential is greater than said given value,
the junction between the diode and resistor in each of said series circuits each forming an output terminal for said bridge,
said bridge being characterized in that an output signal is produced between said output terminals having a certain polarity when the value of said alternating potential is less than said given value and a reverse polarity when the value of said alternating potential is greater than said given value,
and relay means connected between the output terminals of said bridge,
said relay means being energized and de-energized in accordance with the polarity of the output potential developed between said bridge output terminals.

References Cited by the Examiner

UNITED STATES PATENTS

| | | | |
|---|---|---|---|
| 2,818,541 | 12/1957 | Weber et al. | 323—75 X |
| 3,056,048 | 9/1962 | McGrogan | 307—88.5 |
| 3,063,001 | 11/1962 | White | 321—46 X |

OTHER REFERENCES

University of Illinois Graduate Digital Computer Laboratory, Report No. 102, Application of Tunnel Diodes in Switching Circuits, by Kunimiro, pp. 53 and 54, Oct. 26, 1960.

LLOYD McCOLLUM, *Primary Examiner.*

R. D. BLAKESLEE, G. H. GERSTMAN, *Assistant Examiners.*